(12) United States Patent
Cumini et al.

(10) Patent No.: US 12,481,294 B2
(45) Date of Patent: Nov. 25, 2025

(54) MINING AUTOMATION SYSTEM OPERATION ZONE CONTROL

(71) Applicant: SANDVIK MINING AND CONSTRUCTION OY, Tampere (FI)

(72) Inventors: Lauso Cumini, Tampere (FI); Juho Vaara, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 99 days.

(21) Appl. No.: 18/696,260

(22) PCT Filed: Sep. 27, 2022

(86) PCT No.: PCT/EP2022/076787
§ 371 (c)(1),
(2) Date: Mar. 27, 2024

(87) PCT Pub. No.: WO2023/052337
PCT Pub. Date: Apr. 6, 2023

(65) Prior Publication Data
US 2024/0377837 A1    Nov. 14, 2024

(30) Foreign Application Priority Data
Sep. 28, 2021 (EP) ...................................... 21199470

(51) Int. Cl.
G05D 1/617 (2024.01)
G05D 107/70 (2024.01)

(52) U.S. Cl.
CPC ......... G05D 1/617 (2024.01); *G05D 2107/73* (2024.01)

(58) Field of Classification Search
CPC ... G05D 1/617; G05D 2107/73; G05D 1/0214
See application file for complete search history.

(56) References Cited

U.S. PATENT DOCUMENTS

2017/0351264 A1* 12/2017 Ruokojarvi .......... G05D 1/0246

FOREIGN PATENT DOCUMENTS

| EP | 1616077 A1 | 1/2006 |
|---|---|---|
| EP | 3040508 A1 | 7/2016 |
| WO | 2015187081 A1 | 12/2015 |
| WO | 2019214818 A1 | 11/2019 |

* cited by examiner

Primary Examiner — Rodney A Butler
(74) Attorney, Agent, or Firm — Corinne R. Gorski (57) ABSTRACT

A method is provided including the steps of determining a set of passage control units, PCUs, enabling forming of an isolated operation zone of a mining automation system; maintaining an acknowledgement status record for the set of PCUs; determining, based on the acknowledgement status record, a PCU within the set of PCUs for completing isolation of the operation zone; selecting an acknowledgement unit located outside the operation zone to be isolated, the acknowledgement unit being associated with the PCU; and controlling, in response to receiving an acknowledgement from the selected acknowledgement unit, a state of the operation zone.

15 Claims, 4 Drawing Sheets

|  | 5a | 5b | 5c | 5d | 5e | 5f |
|---|---|---|---|---|---|---|
| 4a | O | I | O | I | I | O |
| 4b | I | O |  |  |  |  |
| 4c |  |  | I | O |  |  |
| 4d |  |  |  |  | O | I |
| PCU | 2a | 2a | 2b | 2b | 2c | 2c |
| AS 4a |  |  |  | x | x |  |
| Lack 4a | x |  |  |  |  |  |

MINING AUTOMATION SYSTEM OPERATION ZONE CONTROL

RELATED APPLICATION DATA

This application is a § 371 National Stage Application of PCT International Application No. PCT/EP2022/076787 filed Sep. 27, 2022 claiming priority to EP 21199470.2 filed Sep. 28, 2021.

FIELD

The present invention relates to controlling operation zones of a mining automation system.

BACKGROUND

In a mining automation system, there may be one or more autonomously operating mining work machines. Mining worksites, such as hard rock or soft rock mines or construction worksites, may comprise a variety of operation zones intended to be accessed by different types of mobile work machines, herein referred to as mining vehicles. A mining vehicle may be an unmanned, for example, remotely controlled from a control room, or a manned mining vehicle, such as a vehicle operated by an operator sitting in a cabin of the mining vehicle. Mining vehicles of a mining automation system may be autonomously operating, for example, automated mining vehicles, which in their normal operating mode operate independently without external control but which may be taken under external control at certain operation areas or conditions, such as during states of emergencies.

An isolated operation zone is typically reserved for the operation of the automated mining vehicles, into which zone an access by outsiders and outside vehicles is prevented in order to eliminate any risk of collision. The operation zone being provided with such limited access may be separated from other zones of the worksite or automation system by gates or other kind of passage control devices. However, in order to provide an effective operation of the mine, access may need to be provided also for persons or outside mining vehicles into the operation zone being originally reserved only for the operation of the automated mining vehicles.

According to a first aspect, there is provided an apparatus, being configured to or comprising means configured to: determine a set of passage control units, PCUs, enabling forming of an isolated operation zone of a mining automation system; maintain an acknowledgement status record for the set of PCUs; determine, based on the acknowledgement status record, a PCU within the set of PCUs for completing isolation of the operation zone; select an acknowledgement unit located outside the operation zone to be isolated, the acknowledgement unit being associated with the PCU; and control, in response to receiving an acknowledgement from the selected acknowledgement unit, a state of the operation zone. The means may comprise one or more processors and memory comprising instructions, when executed by the one or more processors, cause the apparatus to perform the method.

According to a second aspect, there is provided a method for operation zone control, the method comprising: determining a set of passage control units, PCUs, enabling forming of an isolated operation zone of a mining automation system; maintaining an acknowledgement status record for the set of PCUs; determining, based on the acknowledgement status record, a PCU within the set of PCUs for completing isolation of the operation zone; selecting an acknowledgement unit located outside the operation zone to be isolated, the acknowledgement unit being associated with the PCU; and controlling, in response to receiving an acknowledgement from the selected acknowledgement unit, a state of the operation zone.

According to a third aspect, there is provided an apparatus comprising at least one processor, at least one memory including computer program code, the at least one memory and the computer program code being configured to, with the at least one processor core, cause the apparatus at least to perform the method or an embodiment of the method.

According to a fourth aspect, there is provided a computer program, a computer program product or (a non-tangible) computer-readable medium comprising computer program code for, when executed in a data processing apparatus, to cause the apparatus to perform the method or an embodiment thereof.

According to a fifth aspect, there is provided a mining automation system, comprising the apparatus of the first aspect or an embodiment thereof, the set of passage control units and a set of acknowledgement units, wherein each of the acknowledgement units is associated with at least one passage control unit.

EMBODIMENTS

Figure 1:
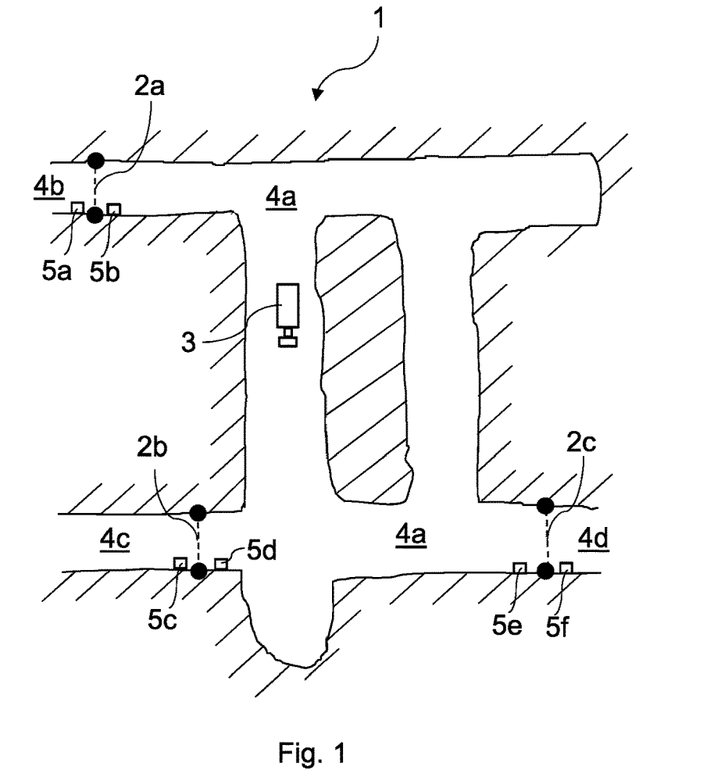
FIG. 1 illustrates an example of an underground work site provided with a system for zone passage control.

FIG. 1 illustrates a simplified example of a portion of mining worksite 1, in the present example comprising underground tunnels. The mining worksite may comprise an ore mine or a construction site, such as a railway or road tunnel site. However, it will be appreciated that a worksite may comprise only on-surface areas, only underground areas, or both surface and underground areas. The term mining vehicle herein refers generally to mobile work machines suitable to be used in the operation of different kinds of underground or surface mining or construction excavation worksites, such as lorries, dumpers, dozers, vans, mobile rock drilling or milling rigs, mobile reinforcement machines, and bucket loaders or other kind of mobile work machines which may be used in different kinds of excavation worksites. The term mobile object may include all mobile objects which may have an access into an operation zone of a worksite, such as mining vehicles and human beings in the worksite. An autonomously operating mining vehicle may, in an autonomous operating mode, operate independently without requiring continuous user control but which may be taken under external control during states of emergencies, for example.

FIG. 1 illustrates a passage control system with operation zones 4a, 4b, 4c, and 4d of a mining automation system. The system comprises passage control units (PCU) 2a, 2b, 2c separating operation zones 4a, 4b, 4c, and 4d. The operation zones may also be referred to as safety zones, for example. For example, PCU 2a is associated with zones 4a and 4b, wherein in the zone 4a there may be an autonomously operating mining vehicle 3. Below a reference sign 4 may be used as a general reference sign for operation zone(s) 4a, 4b, 4c, 4d unless a particular operation zone is referred to. Similarly, PCU may be used as a general reference sign for passage control unit(s) 2a, 2b, 2c, unless a particular PCU is referred to.

At least some of the operation zones may be isolated by their respective separating PCUs, enabling autonomous operation of one or more mining vehicles within the isolated zone. For example, the mining vehicle 3 may be configured to autonomously travel a route in the zone 4a, which may comprise a dump point at the end of the tunnel. In the present simplified example, zone 4a is illustrated entirely, and may be isolated from the other zones.

The PCUs 2 may be associated with one or more (safety controlling) units 5a, 5b, 5c, 5d, 5e, 5f (which may also be referred by general reference 5), for controlling at least some safety related features. Association of an entity with another or counterpart entity may refer to the entities being in physical proximity, and at least one of the entities are assigned to the other. These units 5 may be used at least for acknowledging (ack) the associated PCU, when using the PCU to isolate an operation zone. Acknowledging may refer to generally providing a safety related or clearance confirmation based on an input by a human operator, for clearing the related PCU and/or operation zone. These units 5 may be referred to as acknowledgement/ack units, as in the examples below. As in the present example, at least some of the PCUs may be associated with two (or even more) ack units, arranged at both sides of the PCU. Thus, a related operation zone may be acknowledged from both sides of the PCUs. For example, PCU 2a may be acknowledged by ack unit 5a or 5b, 2b may be acknowledged by 5c or 5d, and 2c may be acknowledged by 5e or 5f.

It is to be appreciated that besides the entities illustrated in simplified FIG. 1, there may be further units, sub-systems or elements, such as a specific passage station as described in EP 1616077. There may be many operations zones within a worksite, for example between 10 to 30 zones and 20 to 60 PCUs for a fleet of vehicles in challenging underground conditions, so it is important to have a proper system supporting management of the zones and individual PCUs.

Figure 2:
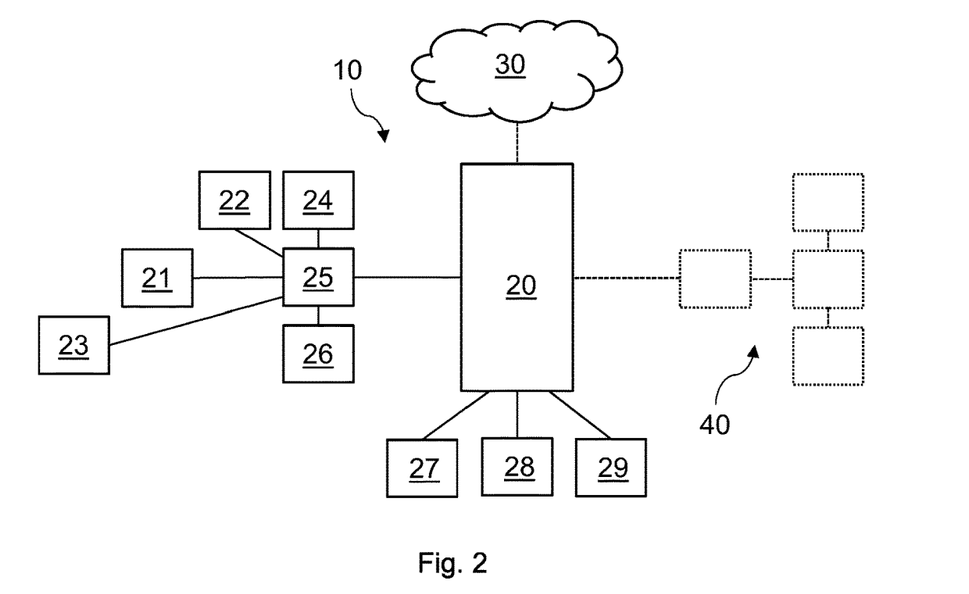
FIG. 2 illustrates a zone passage control system.

FIG. 2 illustrates a system 10 for mining automation system operation zone and passage control. The system comprises a number of functional units 21 to 29 and at least one (system) controller 20 configured to be operationally connected to at least some of the functional units 21 to 29.

The zone control system may comprise detection units 21 which may be considered as functional units in the system 10 and configured to detect a mobile object, such as a mobile mining vehicle or a person, entering into the operation zone 4 and/or exiting the operation zone 4. The detection unit 21 may be comprised by the PCU 2.

When the detection unit 21 detects a mobile object, the detection unit may provide a corresponding signal to the controller 20. The detection unit 21 may be an optoelectronic guard detector, such as a guard detector based on the use of a light curtain or photocells. Alternatively other types of devices, such as laser scanning devices and safety mats, for instance, or any other applicable device to detect a mobile object, may be applied. The detection unit 21 may be configured to detect direction of motion of the mobile object and may also provide such direction information to the controller 20.

Ack units 22 and 23, such as ack units 5a and 5b, may be arranged on both sides of the detection unit 21. The ack units 22 and 23 may be comprised by the PCU or provided in another unit which may be positioned in proximity of the detection unit 21, such as a control box or unit, an access barrier, or a field cabinet.

The system may further comprise identification units 24. The identification unit 24 may be comprised by the PCU and may be configured to identify the mobile object entering or exiting the zone. The identification of the mobile objects may include the identification of the type of the mobile object, in some embodiments if the mobile object is an automated mining vehicle, an unmanned remotely controllable mining vehicle or a manned mining vehicle, or a human being. The identification of the mobile object may also include also the identification of a particular vehicle or person. When the identification unit 24 has identified the mobile object, the identification unit 24 provides a signal comprising associated identification information to the controller 20.

The system 10 for the zone passage control may comprise indication units 26. The indication unit 26 may be comprised by the PCU and may be configured to indicate a state of the associated zone, such as an admissibility state and/or further control information for a mobile object to enter into an associated operation zone 4 and/or exit away from the operation zone 4. For example, traffic light type of visual indication may be applied. The indication unit may also comprise an audio output unit producing an audible signal specific to the admissibility state.

The system 10 for the zone passage control may comprise transceiver units 25. The transceiver unit may be configured to provide a communication link between the functional units disclosed above and the controller 20. Depending on the intended operation of the functional unit the communication link may be established as unidirectional or bidirectional communication link. In the example of FIG. 2 there is a transceiver unit 25 for each PCU and a set comprising one or more of a detection unit 21, an identification unit 24, and an indication unit 26. However, if applicable, a transceiver unit 25 may also be provided to serve communication between the controller 20 and several detection units 21, several identification units 24 and several indication units 26. In another example, unit 25 may be a (local) control unit configured to control at least some of the units 21-24, and 26, and also comprise a transceiver to communicate with the controller 20. Wireless and/or wired transmission technique may be applied. For example, Ethernet based communication or wireless cellular data transmission, such as 4G, 5G, or 6G radio access technology, or wireless local area networking, such as IEEE 802.11 or 802.16 based communications may be applied. Any transceiver unit 25 may be omitted if the respective functional unit(s), i.e. detection units 21, identification units 24 and/or indication units 26 comprise an internal transceiver unit.

For simplicity, only one set of functional units 21, 22, 23, 24, 25, 26 for the PCU is illustrated, but it will be appreciated that the system will comprise a plurality of further sets 40 of similar units. Depending on the embodiment the system 10 for the zone passage control may comprise only some types of the functional units disclosed above, such as one or more of the detection units 21, the ack units 22, 23, and indication units 26.

The system may comprise or be operatively connected to a mining vehicle controller 28 for controlling at least some operations of the mining vehicle. The mining vehicle controller 28 may be provided in each autonomously operating mining vehicle 3 and may be configured to control at least some autonomous operations of the mining vehicle. In response to detecting a mobile object to enter a zone comprising an autonomously operating mining vehicle 3, the controller 20 may be configured to cause or provide a control command to stop the vehicle 3.

The system 10 and the controller 20 may be connected to a further system or network 30, such a worksite management system, a cloud service, an intermediate communications network, such as the internet, etc. The system 10 may further comprise or be connected to a further device 29, such as a handheld user unit, a vehicle unit, a worksite management device/system, a remote control and/or monitoring device/system, data analytics device/system, sensor system/device, etc.

The controller 20 may comprise one or more processors executing computer program code stored in a memory, and it may comprise or be connected to a user interface with a display device as well as operator input interface for receiving operator commands and information to the controller.

The controller 20 may be configured to control a plurality of operation zones 4, such as zones reserved and configured for the operation of the autonomously operating mining vehicles, by the detection units 21, the identification units 24 and the indication units 26. In an alternative embodiment, the controller 20 is configured to control only a single operation zone. Controlling an operation zone may comprise controlling a state of the operation zone. The controller 20 may be configured to send and receive passage control related information to/from other controllers, or there may be a further master control unit configured to control the controllers 20.

State parameter information, indicative of the state of an associated operation zone, may be stored and updated for each zone 4, in some embodiments by the controller 20. The state parameter(s) of a zone 4 indicate operational condition or mode of activities allowed in the zone. In some embodiments, the state parameter may indicate autonomous operation, whereby one or more autonomously operating vehicles are allowed to operate in the zone, with or without monitoring by an operator, and persons (or other mobile objects) are not allowed to enter the zone. Such a state may also be referred to as automation state, for example. In some embodiments, the state parameter may indicate manual operation, whereby autonomous operation is not allowed in the zone and persons and manually operated mining vehicles are allowed to enter the zone. However, it is to be appreciated that there may be other states, such as an emergency state.

The state parameter may be changed in response to manual input by an authorized operator or safety responsible person and/or in response to an automatically performed state (definition) procedure checking or detecting one or more state parameter change conditions. A state parameter of at least one zone 4 may be updated in response to detecting a mobile object to pass a PCU 2 associated with the at least one zone. In some embodiments, positions of mobile objects 3 are continuously monitored and change of a mobile object from one zone to another triggers the state procedure.

According to an embodiment, the controller 20 is configured to determine the state of the zone 4 on the basis of information supplied by at least some of the detection unit(s) 21, ack units 22, 23, the identification unit(s) 24, and an operator input directly via a user interface to the controller 20 or indirectly via another unit 27, such as a wireless operator unit. The system may further store information about at least one of a number and/or a type of mobile objects existing in the zone 4 and a number and/or a type of mobile objects entering or exiting the zone.

Further, the controller 20 may be configured to determine, on the basis of the determined state of the zone, an admissibility level for a mobile object to enter the zone 4. The controller 20 may also be configured to determine, on the basis of the determined state of the zone, an admissibility level for a mobile object to exit the zone. For example, the controller 20 may be configured to perform at least some zone passage control features on the basis of admissibility level as illustrated in EP 3040508.

However, it is to be appreciated that in an alternative embodiment, at least some of the presently disclosed functions for the controller 20 may, instead of a centralized approach, be arranged as decentralized, in a distributed system. Furthermore, it is to be appreciated that at least some of the disclosed units/devices may be Internet of Things (IoT) devices.

After a user, such as an operator or designer has selected or confirmed PCUs 2a-2c to be used for passage control to isolate the zone 4a to become an automation area or zone, the next step may be checking the automation area and acknowledging the selected PCUs. When the automation area and the PCUs are to be brought into operation, a user checks that the zone is clear to be isolated, and acknowledges each of the PCUs by an associated ack unit 5. For example, the user checks that there are no inappropriate persons or devices remaining in the zone and autonomous operation of mining vehicle(s) may be permitted in the zone. The ack unit 5 may be configured to detect a user input of pressing a switch or acknowledging with a key, for example. The ack unit 5, or the associated PCU 2, may be configured to transmit an ack signal to the controller 20 in response to detecting the user input to ack the PCU. According to an embodiment, the controller 20 may be configured to activate the PCU 2 to carry out passage control upon the ack signal. Alternatively, the controller 20 may be configured to transmit a separate activation signal upon receiving acks from all ack units or thereafter transitioning to the autonomous operation state. However, if a user acks the PCUs by ack unit within the operation zone, for example by 5b, 5d, and 5e for zone 4a, there is a risk of a hazardous situation or an unnecessary error causing delay. For example, there may be a risk of entering the zone into autonomous operation state while the operator is still inside the operation zone.

Improvements are now provided for a passage control system for controlling operation zones in mining automation system and their state transition, enabling to improve autonomous operations efficiency and facilitating to reduce safety risks.

Figure 3:
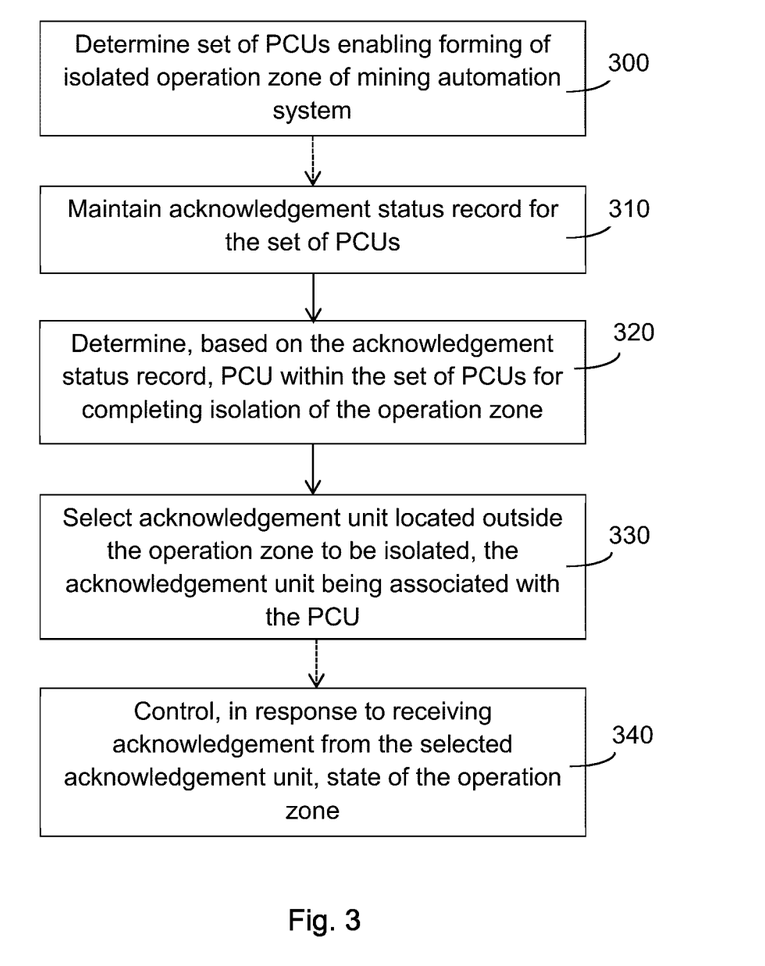
FIGS. 3, 4a, and 4b illustrate methods according to at least some embodiments.

FIG. 3 illustrates a method for controlling operations zones of a mining automation system. At least one apparatus, which may be a device of a zone passage control system, such as the controller 20, may be configured to perform the method, as a computer-implemented method.

The method comprises determining 300 a set of PCUs, such as PCUs 2a to 2c, enabling forming of an isolated operation zone of a mining automation system. The set of PCUs may thus be associated with, or assigned to, the operation zone. The operation zone may be determined for autonomous mining vehicle operations. This block may be performed based on received inputs from an operator or a designer via a UI, such as mining automation GUI, safety system GUI, passage control GUI, or mining operations design or control GUI. Block 300 may be performed as part of mining automation planning and preparation stage. For example, the user may select PCUs 2a, 2b, and 2c to define and isolate the zone 4a. The apparatus may thus be configured to store identifiers of the PCUs in association of a zone identifier, for example in a zone configuration data record. When the PCUs have been pre-defined for the zone, the determining 300 may refer to receiving identifiers of the PCUs from a memory, for example in response to receiving an input to isolate the zone and/or change the state of the zone into autonomous operation.

Block 310 comprises maintaining an acknowledgement status record for the set of PCUs. The acknowledgement status record may be an operation zone specific data record, or complement zone configuration data record, for example. Block 310 may be repeatedly performed on the basis of acknowledgements received from ack units of PCUs in the set.

Block 320 comprises determining, based on the acknowledgement status record, a PCU within the set of PCUs for completing isolation of the operation zone. Completing the isolation may refer to finalizing a security or zone isolation procedure, comprising receiving acknowledgements from all associated PCUs, required as a precondition for changing state of the operation zone (into a state allowing autonomous operation), some further example features being illustrate below.

Block 330 comprises selecting an ack unit located outside the operation zone to be isolated, the acknowledgement unit being associated with the PCU.

Block 340 comprises controlling, in response to receiving an ack from the selected ack unit, a state of the operation zone.

The apparatus performing the method may be configured to, if an ack is received after block 330 from another ack unit of the PCU (inside the zone), instead of entering block 340, proceed the method to prevent the operation zone to enter autonomous operation state.

Figure 4A:
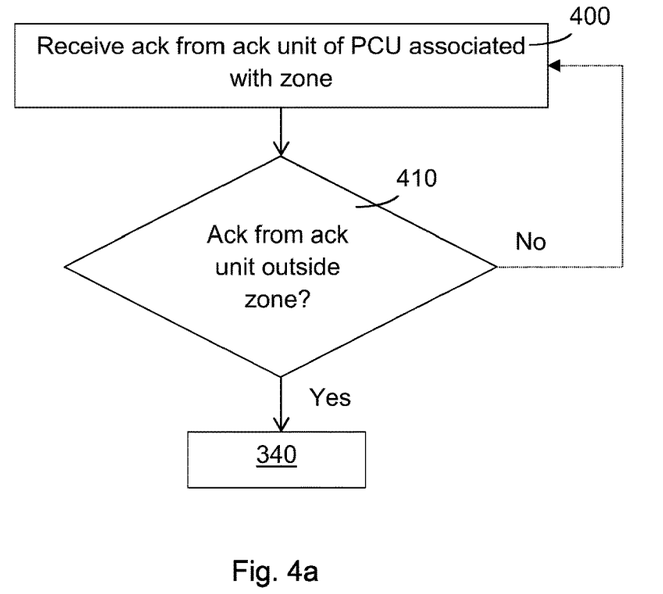

With reference to FIG. 4a, the apparatus may thus be configured to perform, between blocks 330 and 340, an intermediate block 400 of receiving an ack. Further, there the apparatus may be configured to perform an intermediate block of determining 410 if the received ack is from the selected ack unit. This may comprise determining (an identifier of) the source ack unit of the received ack. For example, block 410 may comprise comparing an (ack unit) identifier received within an ack message to an ack unit identifier prestored in connection with block 330. If they match, block 340 may be entered. If they do not match, the received ack may be ignored, at least for the zone being considered, and the procedure may return to wait for a new ack.

In another example embodiment, the apparatus is configured to define a source position of the ack unit (in respect to the operation zone) in response to block 400. Block 410 may thus comprise performing block 330, for example determining from which ack unit last ack needs to be received in order to enter block 340 and complete the isolation of the zone.

When the received ack is originating from the selected ack unit (of the appropriate final and remaining PCU and) outside of the operation zone determined in block 330, the apparatus performing the method may be configured to permit the operation zone in block 340 to be isolated (i.e. for completing the isolation) and enter autonomous operation state. The ack from the selected ack unit may thus be a precondition for controlling the state of the operation zone into the autonomous operation state. For example, the controller 20 may be configured to enter a next stage or check routine in zone isolation procedure, control the state of the zone into an autonomous operation state or mode, or transmit a control signal to a further unit. Thus, in some embodiments the reception of the ack from the selected ack unit in block 340 does not directly lead to the zone state change (but facilitates it), but there may be further checks or conditions to be successfully completed in order to complete the zone isolation and state change. In an embodiment, the controller 20 is configured to perform a system check after receiving the acks from all PCUs configured for the zone being isolated. The system check may comprise a set of checking routines, such as checking operation of associated connections. The controller may be configured to change the state of the zone in response to passing the system check.

Figure 4B:
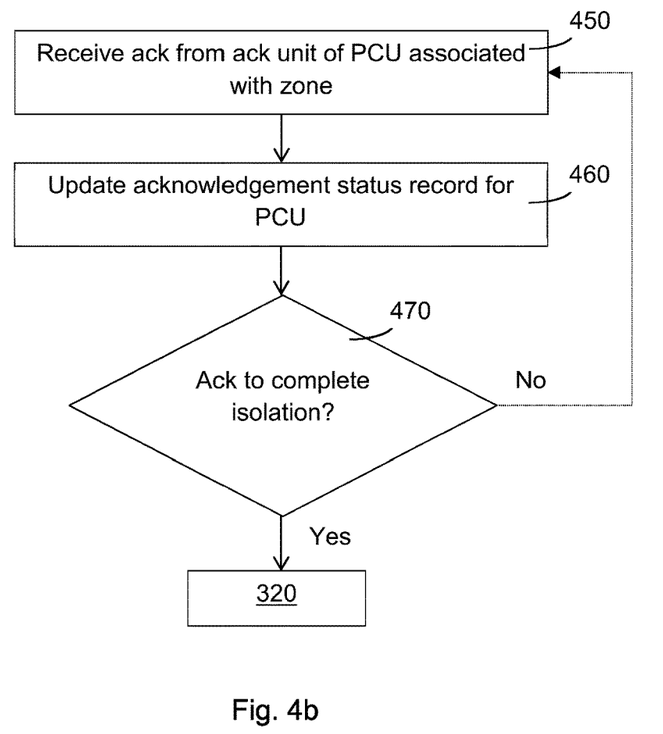

The apparatus may be configured to enter block 320 in response to detecting a condition to complete isolation of the operation zone based on received acks and the ack status record. With reference to FIG. 4b, the apparatus may be configured to perform further block(s) preceding block 320. The apparatus may be configured to receive 450 an ack from an ack unit associated with a PCU (associated with the zone), and update 460 the ack status record of the zone accordingly. The apparatus may be configured to check 470 if isolation of the zone may be completed (or completion stage entered). This may be performed on the basis of parsing the received ack and ack status of PCUs associated with the zone and stored in the ack status record. The apparatus may be configured to check if acks have been received from all other PCUs associated with the operation zone except one, for example, there remains only one PCU to ack. If there is only one remaining PCU to be acknowledged, the apparatus may be configured to enter block 320 and 330, and automatically force ack from outside the zone. The apparatus may be configured to wait for a subsequent ack after block 330, and, for example, perform the embodiment of FIG. 4a. However, in another embodiment, the apparatus is configured to perform blocks 320 and 330 in response to receiving an ack from the respective (last PCU).

The apparatus may be configured to determine an originating ack unit of a received ack, for example in block 410, in respect of the operation zone for all received acks, or only in response to detecting that safety acks have been received from all other PCUs of the set (except the last PCU to be acknowledged).

The selection of block 330 may comprise checking configuration information of the respective (last acknowledged) PCU, and in particular to determine which ack unit is outside the zone. For example, the controller 20 may be configured to maintain or access configuration information for each PCU of the set of PCUs, wherein the configuration information defines for each PCU:

a PCU identifier,
identifiers of the acknowledgement units of the PCU, and
an indication of position of each acknowledgement unit of the PCU in respect of the operation zone.

The apparatus may be configured to select 330 the ack unit on the basis of the configuration information, based on examining which ack unit associated with the PCU determined in block 320 is outside the operation zone.

In another embodiment, in which block 330 is performed in response to receiving the ack from the selected PCU, the apparatus may be configured to determine the originating position/ack unit of the received ack on the basis of the configuration information and an identifier in a received message comprising the received ack.

The ack status record may indicate, for each PCU in the set, if an ack has been received from the PCU or not. The ack status record may comprise for each PCU an ack position parameter. The ack position parameter may indicate:

1) if a PCU in the set of PCUs can be acknowledged either from inside or outside of the operation zone or by either ack unit associated with the PCU, or
2) if the PCU needs to be acknowledged from outside of the operation zone or only by a given ack unit associated with the PCU, and The apparatus may be configured to update the ack status record on the basis of acks received from PCUs in the set. For example, the controller 20 may be configured to set the ack position parameter to indicate above parameter option 2) for the PCU in or in response to block 320. The apparatus may be configured to control the ack unit selection in block 330 on the basis of the ack position parameter. For example, the controller 20 may be configured to read the value of the ack position parameter upon receiving an ack after block 320 or 330, and permit (for example in block 410) transition to block 340 only upon the ack being received from an ack unit outside the zone.

Figure 5:
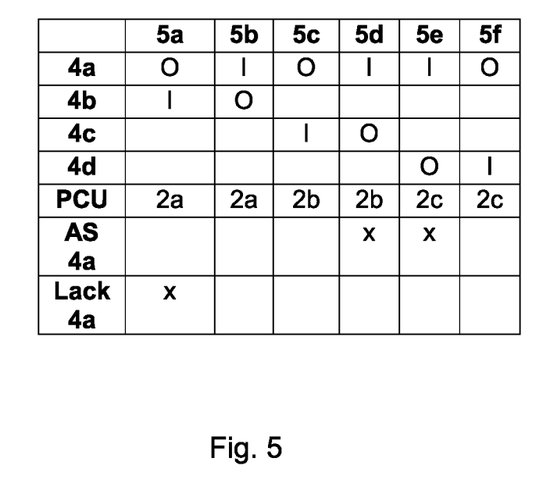
FIG. 5 illustrates an example of zone configuration data.

Reference is made to FIG. 5 illustrating a simplified example of zone configuration data, with reference to example configuration of FIG. 1, indicating positions of ack units 5a to 5e in respect to zones 4a to 4d. O indicates that the ack unit is outside the zone and I that the ack unit is inside the zone.

FIG. 5 further illustrates that each ack unit is associated with a PCU. In the example of FIG. 5, PCU 2a is associated with ack units 5a and 5b, PCU 2b is associated with ack units 5c and 5d, and PCU 2c is associated with ack units 5e and 5f. The second last row indicates ack status (AS) for zone 4a, updated based on received acks. In the present example, acks have been received from ack units 5d and 5e. The controller 20 may be configured to detect, based on the stored information, that PCUs 2b and 2c have been acknowledged and dynamically determine that last ack is required from ack unit 5a in order to complete isolation of zone 4a. There may be a further parameter, which may be part of the ack status record and referred, for example, to as dynamic last ack (Lack) or safety zone last ack. The apparatus may be configured to update the Lack in block 330 on the basis of the ack status to determine the last ack location/unit. In the present example situation, the Lack is updated to indicate ack unit 5a for zone 4a.

It will be appreciated that the information as illustrated in the simplified table of FIG. 5 may be stored in various ways and in different records. For example, the controller 20 may be configured to generate a zone specific record when creating a new zone, and include identifiers of selected PCU and ack units in the record. In another example embodiment of arranging the Lack parameter, the controller 20 may be configured to define a value for each PCU associated with a zone, to define how the respective PCU needs to be acknowledged. For example, value "0" may indicate that ack location is not set, thereby indicating that the PCU can be acknowledged from any ack unit of the PCU. In case there are two different ack units/locations, such as access barrier cabinets and control boxes to ack a PCU, value "1", or another identifier, such as a device ID, may indicate that a first ack unit is the last ack location and value "2" that a second ack unit is the last ack location for the last PCU and to complete the isolation of the zone.

The apparatus may be configured to generate and maintain 310 the ack status record in response to an acknowledgement claim for operation zone clearance. The acknowledgement claim may generally refer to a acknowledgement request or instruction in a safety or operation zone change procedure to set the operation zone into the autonomous operation state, to authorize one or more mining vehicles to operate autonomously inside the operation zone. Such claim may be received after block 300, for example, based on a received input from the user to activate the isolation of the zone after configuring the set of PCUs for the zone.

The apparatus, such as the controller 20, may be configured to cause a control signal, on the basis of current safety acknowledgement state defined in the acknowledgement status record, to control an indicator of an ack unit 5 to indicate if the acknowledgement unit may be used for acknowledging a PCU associated with the acknowledgement unit. This may be performed in response to block 330. The indicator is configured to at least output a visual and/or an audible indication dependent on the signal, to indicate which ack unit the user should use for completing the clearance and isolation of the operation zone. The indicator may also indicate an admissibility level of the operation zone. The indicator may be provided in or in connection with each ack unit, or in another device, such as the indicator unit 26.

The ack unit 5 may be, or is comprised by, a device, which may be, for example, an access barrier, field cabinet, control box, or control unit, which comprises an input element for at least acknowledging the PCU. Such device may further comprise a communications unit (25) connectable to the apparatus, such as the controller 20, and the indicator configured to indicate an ack status of the zone or PCU and/or admissibility level of the operation zone. The communications unit may be configured to transmit an ack to the apparatus performing the method of FIG. 3. For example, the ack unit 5 may be, or is comprised by, a control box or unit comprising the indicator configured to indicate an admissibility level of the operation zone, and the input element for at least acknowledging the PCU.

There may be further rules for acknowledging the PCUs 2 by the ack units 5. In an embodiment, within the ack procedure, the apparatus is configured to require at least ack (before the last ack of acknowledging the PCU in the set) from an ack unit inside the zone.

When in the autonomous operation state after block 340, authorized mining vehicle(s) 3 may travel within the zone 4a. In an embodiment, the apparatus, such as the controller 20, is configured to transmit a continuous security or 'lifeline' signal to an autonomously operating mining vehicle to allow the vehicle to operate within the zone. In such embodiments, transmission of the lifeline signal may be initiated after entering the autonomous operation (and starting operation of the vehicle). The apparatus may be configured to stop sending this lifeline signal in response to detecting a mobile object by the detection unit 21, causing the vehicle to stop. The apparatus may be configured to thus change the state of the zone (for example into the manual operation state). The apparatus may be configured to require performing re-clearance and re-acknowledging the PCUs of the zone, which may comprise repeating blocks 310 to 340, in order to again entering the autonomous operation state and continuing autonomous operation of the vehicle within the zone.

An electronic device comprising electronic circuitries may be an apparatus for realizing at least some embodiments, such as the method of FIG. 3. The apparatus may be comprised in at least one computing device connected to or integrated into a passage control system which may be part of a worksite control or automation system.

Figure 6:
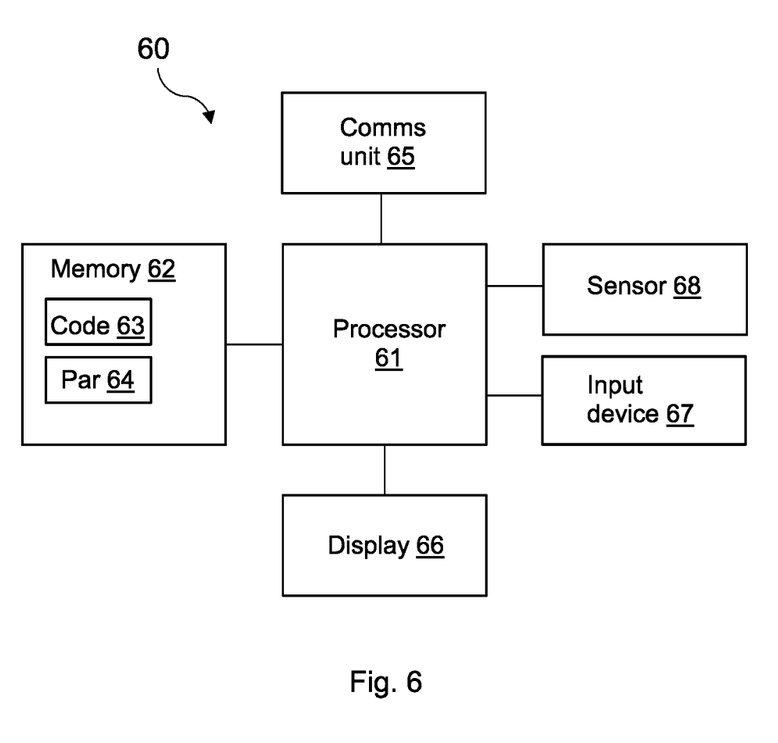
FIG. 6 illustrate an apparatus capable of supporting at least some embodiments.

FIG. 6 illustrates an example apparatus capable of supporting at least some embodiments of the present invention. Illustrated is a device 60, which may comprise or implement the controller 20 illustrated above. The device may be configured to carry out at least some of the embodiments, such methods 3, 4a and/or 4b, relating to controlling operation zones as illustrated above.

Comprised in the device 60 is a processor 61, which may comprise, for example, a single- or multi-core processor. The processor 61 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 60 may comprise memory 62. The memory may comprise random-access memory and/or permanent memory. The memory may be at least in part accessible to the processor 61. The memory may be at least in part comprised in the processor 61. The memory may be at least in part external to the device 60 but accessible to the device. The memory 62 may be means for storing information, such as parameters 64 affecting operations of the device. The parameter information in particular may comprise zone and zone state information. PCU related configuration information, ack status information, and/or other parameters as appropriate for the passage control system and the designated role of the device in the system.

The memory 62 may comprise computer program code 63 including computer instructions that the processor 61 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 60 may comprise a communications unit 65 comprising a transmitter and/or a receiver. The transmitter and the receiver may be configured to transmit and receive, respectively, for example, data and control commands within or outside the vehicle. The transmitter and/or receiver may be configured to operate in accordance with long term evolution, LTE, 3GPP new radio access technology (N-RAT), wireless local area network, WLAN, a non-terrestrial communication standard, and/or Ethernet standards, for example. The device 60 may comprise a near-field communication, NFC, transceiver. The NFC transceiver may support at least one NFC technology, such as NFC, Bluetooth, or similar technologies.

The device 60 may comprise or be connected to a UI. The UI may comprise at least one of a display 66, a speaker, an input device 67 such as a keyboard, a joystick, a touchscreen, and/or a microphone. A user may operate the device and the rock processing machine via the UI, for example to change operation state, change display views, modify parameters 64 in response to user authentication and adequate rights associated with the user, etc.

The device 60 may further comprise and/or be connected to further units, devices and systems, such as one or more sensors 68 sensing environment of the device 60. In particular, the device 60 and the processor 61 may be connected to operational and/or physical entities illustrated above for example in connection with FIG. 2.

The processor 61, the memory 62, the communications unit 65 and the UI may be interconnected by electrical leads internal to the device 60 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

The apparatus, such as the device 60, which may comprise or implement the controller 20, may be configured to determine a set of passage control units, PCUs, enabling forming of an isolated operation zone of a mining automation system; maintain an acknowledgement status record for the set of PCUs; determine, based on the acknowledgement status record, a PCU within the set of PCUs for completing isolation of the operation zone; select an acknowledgement unit located outside the operation zone to be isolated, the acknowledgement unit being associated with the PCU; and control, in response to receiving an acknowledgement from the selected acknowledgement unit, a state of the operation zone.

The apparatus may be configured to prevent the operation zone to enter an autonomous operation state in response to detecting an acknowledgement from another acknowledgment unit of the PCU.

The apparatus may be configured to determine the PCU and select the acknowledgment unit in response to detecting, on the basis of the acknowledgement status record, that safety acknowledgements have been received from all other PCUs of the set, and control the state of the operation zone to autonomous operation state on the basis of the received acknowledgement from the selected acknowledgement unit.

The apparatus may be configured to maintain or access configuration information for each PCU of the set of PCUs, wherein the configuration information defines for each PCU: a PCU identifier, identifiers of acknowledgement units associated with of the PCU, and an indication of position of each acknowledgement unit of the PCU in respect of the operation zone. The apparatus may be configured to select the acknowledgement unit on the basis of the configuration information and an identifier in a received message comprising the received acknowledgement.

The acknowledgement status record may indicate, for each PCU in the set, if an acknowledgement has been received from the PCU. The acknowledgement status record may comprise for each PCU an acknowledgement position parameter indicating:

if a PCU included in the set of PCUs can be acknowledged either from inside or outside of the operation zone or by either acknowledgement unit of the PCU, or if the PCU needs to be acknowledged from outside of the operation zone or only by a given acknowledgement unit of the PCU The apparatus may be configured to update the acknowledgement status record on the basis of acknowledgements received from PCUs in the set, and control selecting the acknowledgement unit on the basis of the acknowledgement position parameter.

The apparatus may be configured to generate a control signal, on the basis of current acknowledgement state defined in the acknowledgement status record, to control an indicator of an acknowledgement unit to indicate if the acknowledgement unit may be used to acknowledge a PCU associated with the acknowledgement unit.

The acknowledgment unit may be, or be comprised by, an access barrier or field cabinet, wherein the access barrier or the filed cabinet comprises a communications unit connectable to the apparatus, an indicator configured to indicate an admissibility level of the operation zone, and an input element for at least receiving an input from an operator to acknowledge the PCU.

The apparatus may be configured to receive the acknowledgement from the communications unit.

A mining automation system, or a passage control system, such as the system 10, may comprise the apparatus, a set of passage control units and a set of acknowledgement units, wherein each of the acknowledgement units is associated with at least one passage control unit.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, elements, and/or materials may be presented in a common list for convenience. However, these lists should be construed as though each member of the list is individually identified as a separate and unique member. Furthermore, the described features, items, elements, or characteristics may be combined in any suitable manner in one or more embodiments.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus for controlling isolation of operation zones of a mining automation system having passage control units, PCUs, separating the operation zones, the PCUs being associated with one or more acknowledgement units for providing, based on a user input, an acknowledgement comprising a safety related confirmation that an operation zone can be isolated by an associated PCU, the apparatus comprising at least one processor and at least one memory including computer program code, the at least one memory and the computer program code configured to, with the at least one processor, cause the apparatus at least to:

determine a set of passage control units, PCUs, enabling forming of an isolated operation zone of the mining automation system;

store an acknowledgement status record comprising zone configuration data including identifiers of the PCUs in the set of PCUs in association of an operation zone identifier of the operation zone;

maintain the stored acknowledgement status record for the set of PCUs, the acknowledgement status record indicating, for each PCU in the set of PCUs, if an acknowledgement has been received from an acknowledgement unit of the PCU;

determine, based on the acknowledgement status record, a PCU associated with two acknowledgement units arranged at both sides of the PCU within the set of PCUs for completing isolation of the operation zone;

select from the two acknowledgement units associated with the PCU an acknowledgement unit located outside the operation zone to be isolated; and control, in response to receiving an acknowledgement from the selected acknowledgement unit, a state of the operation zone indicating a mode of activities allowed in operation zone.

2. The apparatus of claim 1, wherein the at least one memory and the computer program code are configured to, with the at least one processor, cause the apparatus to prevent the operation zone from entering an autonomous operation state in response to detecting an acknowledgement from another acknowledgment unit of the PCU.

3. The apparatus of claim 1, wherein the at least one memory and the computer program code are configured to, with the at least one processor, cause the apparatus to:

determine the PCU and select the acknowledgment unit in response to detecting, on the basis of the acknowledgement status record, that safety acknowledgements have been received from all other PCUs of the set; and control the state of the operation zone to an autonomous operation state on the basis of the received acknowledgement from the selected acknowledgement unit.

4. The apparatus of claim 1, wherein the at least one memory and the computer program code are configured to, with the at least one processor, cause the apparatus to:

maintain or access configuration information for each PCU of the set of PCUs, wherein the configuration information defines for each PCU: a PCU identifier, identifiers of acknowledgement units associated with of the PCU, and an indication of position of each acknowledgement unit of the PCU in respect of the operation zone; and select the acknowledgement unit on the basis of the configuration information and an identifier in a received message including the received acknowledgement.

5. The apparatus of claim 1, wherein the acknowledgement status record includes for each PCU an acknowledgement position parameter indicating:

if a PCU included in the set of PCUs can be acknowledged either from inside or outside of the operation zone or by either acknowledgement unit of the PCU; or if the PCU needs to be acknowledged from outside of the operation zone or only by a given acknowledgement unit of the PCU; and wherein the at least one memory and the computer program code are configured to, with the at least one processor, cause the apparatus to:

update the acknowledgement status record on the basis of acknowledgements received from PCUs in the set; and control selecting the acknowledgement unit on the basis of the acknowledgement position parameter.

6. The apparatus of claim 1, wherein the at least one memory and the computer program code are configured to, with the at least one processor, cause the apparatus to generate a control signal, on the basis of a current acknowledgement state defined in the acknowledgement status record, and to control an indicator of an acknowledgement unit to indicate if the acknowledgement unit may be used to acknowledge a PCU associated with the acknowledgement unit.

7. The apparatus of claim 1, wherein the acknowledgment unit is, or is comprised by, an access barrier or field cabinet, wherein the access barrier or the field cabinet comprises:
   a communications unit connectable to the apparatus;
   an indicator configured to indicate an admissibility level of the operation zone; and
   an input element for at least receiving an input from an operator to acknowledge the PCU, and wherein the at least one memory and the computer program code are configured to, with the at least one processor, cause the apparatus to receive the acknowledgement from the communications unit.

8. A method for controlling isolation of operation zones of a mining automation system including passage control units, PCUs, separating the operation zones, the PCUs being associated with one or more acknowledgement units for providing, based on a user input, an acknowledgement including a safety related confirmation for clearing that an operation zone can be isolated by the associated PCU, the method comprising:
   determining a set of passage control units, PCUs, enabling forming of an isolated operation zone of a mining automation system;
   storing an acknowledgement status record comprising zone configuration data including identifiers of the PCUs in the set of PCUs in association of an operation zone identifier of the operation zone;
   maintaining the stored acknowledgement status record for the set of PCUs, the acknowledgement status record indicating, for each PCU in the set, if an acknowledgement has been received from an acknowledgement unit of the PCU;
   determining, based on the acknowledgement status record, a PCU associated with two acknowledgement units arranged at both sides of the PCU within the set of PCUs for completing isolation of the operation zone;
   selecting from the two acknowledgement units associated with the PCU an acknowledgement unit located outside the operation zone to be isolated, the acknowledgement unit being associated with the PCU; and
   controlling, in response to receiving an acknowledgement from the selected acknowledgement unit, a state of the operation zone indicating a mode of activities allowed in operation zone.

9. The method of claim 8, further comprising preventing the operation zone from entering an autonomous operation state in response to detecting an acknowledgement from another acknowledgment unit of the PCU.

10. The method of claim 8, further comprising:
    determining the PCU and selecting the acknowledgment unit in response to detecting, on the basis of the acknowledgement status record, that safety acknowledgements have been received from all other PCUs of the set, and
    controlling the state of the operation zone to an autonomous operation state on the basis of the received acknowledgement from the selected acknowledgement unit.

11. The method of claim 8, further comprising:
    maintaining or accessing configuration information for each PCU of the set of PCUs, wherein the configuration information defines for each PCU: a PCU identifier, identifiers of the acknowledgement units of the PCU, and an indication of position of each acknowledgement unit of the PCU in respect of the operation zone, and
    selecting the acknowledgement unit on the basis of the configuration information and an identifier in a received message including the received acknowledgement.

12. The method of claim 8, wherein the acknowledgement status record includes for each PCU an acknowledgement position parameter indicating:
    if a PCU in the set of PCUs can be acknowledged either from inside or outside of the operation zone or by either acknowledgement unit of the PCU, or
    if the PCU needs to be acknowledged from outside of the operation zone or only by a given acknowledgement unit of the PCU, and
    the method further comprising:
    updating the acknowledgement status record on the basis of acknowledgements received from PCUs in the set; and
    controlling selecting the acknowledgement unit on the basis of the acknowledgement position parameter.

13. The method of claim 8, further comprising generating a control signal, on the basis of a current safety acknowledgement state defined in the acknowledgement status record, to control an indicator of an acknowledgement unit to indicate if the acknowledgement unit may be used to acknowledge a PCU associated with the acknowledgement unit.

14. A computer program comprising code for, when executed in a data processing apparatus, causes the method in accordance with claim 8 to be performed.

15. A mining automation system, comprising:
    the apparatus of claim 1;
    the set of passage control units; and
    a set of acknowledgement units, wherein each of the acknowledgement units is associated with at least one passage control unit.

* * * * *